(12) United States Patent
Tahir

(10) Patent No.: US 12,233,403 B1
(45) Date of Patent: Feb. 25, 2025

(54) TRIPHENYLPHOSPHINE RUTHENIUM PHOTOCATALYST FOR HYDROGEN PRODUCTION

(71) Applicant: United Arab Emirates University, Al Ain (AE)

(72) Inventor: Muhammad Tahir, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 18/622,251

(22) Filed: Mar. 29, 2024

(51) Int. Cl.
| | |
|---|---|
| *B01J 31/00* | (2006.01) |
| *B01J 21/06* | (2006.01) |
| *B01J 27/24* | (2006.01) |
| *B01J 31/24* | (2006.01) |
| *B01J 31/38* | (2006.01) |
| *B01J 35/39* | (2024.01) |
| *B01J 35/45* | (2024.01) |
| *B01J 37/00* | (2006.01) |
| *B01J 37/02* | (2006.01) |
| *B01J 37/04* | (2006.01) |
| *B01J 37/06* | (2006.01) |
| *B01J 37/08* | (2006.01) |
| *C01B 3/04* | (2006.01) |

(52) U.S. Cl.
CPC ............ *B01J 31/38* (2013.01); *B01J 21/063* (2013.01); *B01J 27/24* (2013.01); *B01J 31/2419* (2013.01); *B01J 35/39* (2024.01); *B01J 35/45* (2024.01); *B01J 37/0036* (2013.01); *B01J 37/0221* (2013.01); *B01J 37/04* (2013.01); *B01J 37/06* (2013.01); *B01J 37/084* (2013.01); *C01B 3/042* (2013.01); *B01J 2231/005* (2013.01); *B01J 2531/821* (2013.01)

(58) Field of Classification Search
None
See application file for complete search history.

(56) References Cited

U.S. PATENT DOCUMENTS

| | | | | |
|---|---|---|---|---|
| 4,459,191 A | * | 7/1984 | Gardner | C07C 209/60 204/157.81 |
| 2015/0352539 A1 | * | 12/2015 | Miyajima | C01B 3/042 204/157.52 |
| 2017/0355607 A1 | * | 12/2017 | Hosono | B01J 35/613 |

OTHER PUBLICATIONS

Tahir et al, Ru-embedded 3D g-C3N4 hollow nanosheets (3D CNHNS) with proficient charge transfer for stimulating photocatalytic H2 production, international journal of hydrogen energy, 46, 27997-28010 (Year: 2021).*

Li et al, MXene Ti3C2 decorated g-C3N4/ZnO photocatalysts with improved photocatalytic performance for CO2 reduction, Nano Materials Science, 5, pp. 237-245, Mar. 2023 (Year: 2023).*

(Continued)

*Primary Examiner* — Stefanie J Cohen
(74) *Attorney, Agent, or Firm* — MH2 Technology Law Group, LLP

(57) ABSTRACT

The present disclosure discloses a photocatalyst for hydrogen production from water. The photocatalyst comprises triphenylphosphine ruthenium (RuP) complex. The RuP complex is a co-catalyst with graphitic carbon nitride. The present disclosure also discloses a method of synthesizing a photocatalyst for hydrogen production from water. The method comprises forming a suspension of graphitic carbon nitride; adding triphenylphosphine ruthenium complex (RuP) to the suspension; and drying the suspension to form dried graphitic carbon nitride integrated with RuP.

10 Claims, 8 Drawing Sheets

(56) References Cited

OTHER PUBLICATIONS

Li et al, MXene Ti3C2 decorated g-C3N4/ZnO photocatalysts with improved photocatalytic performance for CO2 reduction, Nano Materials Science, 5, supporting information, Mar. 2023 (Year: 2023).*

* cited by examiner

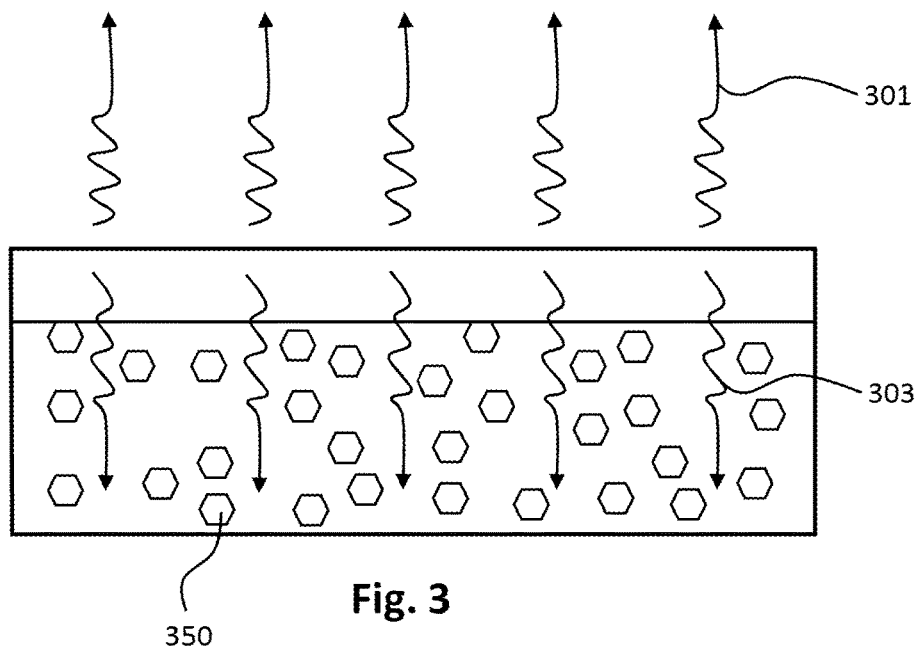
Fig. 3
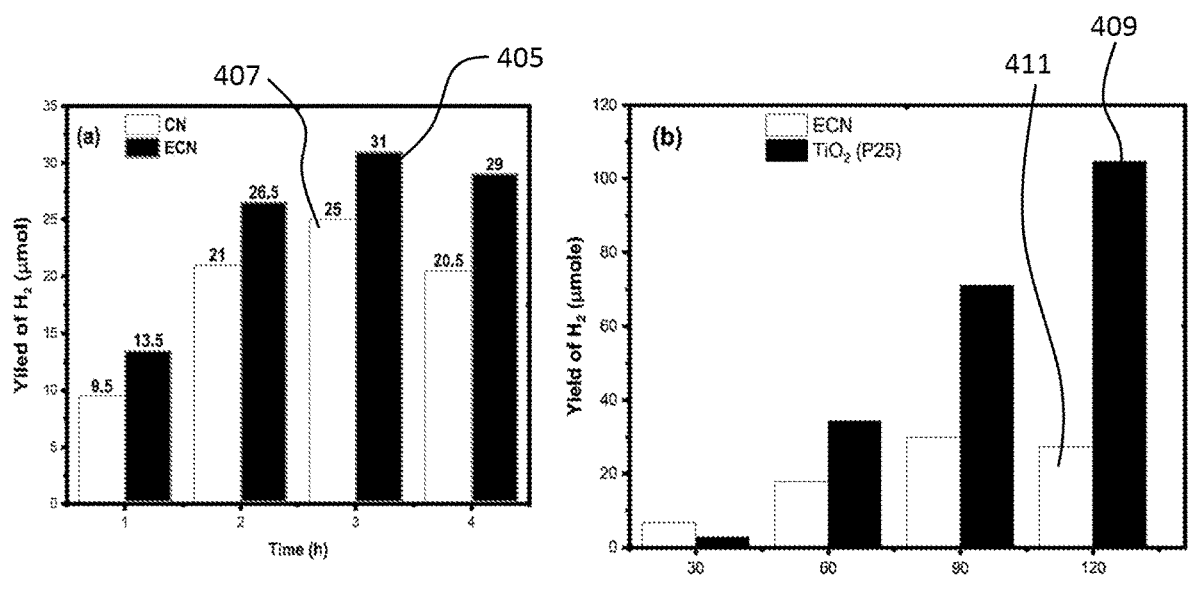
Fig. 4a
Fig. 4b

TRIPHENYLPHOSPHINE RUTHENIUM PHOTOCATALYST FOR HYDROGEN PRODUCTION

FIELD

The present disclosure relates to the field of photocatalysts. More specifically, but not exclusively, the present disclosure relates to triphenylphosphine ruthenium photocatalysts for hydrogen production.

BACKGROUND

Background description includes information that will be useful in understanding the present invention. It is not an admission that any of the information provided herein is prior art or relevant to the presently claimed invention, or that any publication specifically or implicitly referenced is prior art.

Greenhouse gases, such as carbon dioxide ($CO2$), are released while burning fossil fuels, which hurt the environment and cause climate change and global warming. According to the United Nations (UN) sustainable development goals (SDGs), a global temperature should not exceed 1.5 degrees Celsius to achieve sustainability.

Photocatalytic hydrogen production represents a promising avenue for replacing fossil fuels and advancing towards a low-carbon economy. This technology leverages the power of sunlight to drive a chemical reaction, ultimately producing hydrogen as a clean and renewable energy carrier.

Solar energy is an abundant and renewable resource that can be harnessed for photocatalytic hydrogen production. This approach aligns with to transition from finite fossil fuel resources to sustainable and environmentally friendly energy sources.

Photocatalysts, typically semiconductors like metal oxides and nitrides, play a pivotal role, however, they have low efficiency and are unable to utilize solar energy.

Cocatalysts, such as metal nanoparticles, and optimizing the catalyst design are strategies to enhance the efficiency of the water-splitting process. Efficient charge separation and transfer are key components in achieving high conversion rates. The economic viability of photocatalytic hydrogen production involves considerations of the cost of materials, catalysts, and the overall system.

Innovations in materials and production methods are necessary to make this technology competitive with traditional fossil fuels.

Although heterojunction can enhance hydrogen yield, compared to their cost and complicated synthesis process, their performance is not high enough compared to metal loading to semiconductor. This, in addition to building heterostructure, another approach that can effectively enhance photocatalytic performance is through using metals as cocatalysts. Metals such as platinum (Pt), gold (Au), Iridium (Ir), palladium (Pd), and rhodium (Rh) are considered for use in photocatalytic applications due to their ability to promote hydrogen evolution.

However, noble metals are expensive and their use in commercial applications is not permitted. Therefore, noble metal free cocatalyst for photocatalytic hydrogen evolution reactions are particularly important.

The present disclosure seeks to overcome the abovementioned problems. More specifically, but not exclusively, the present disclosure seeks to provide a more efficient and effective photocatalyst.

SUMMARY

There is provided, according to a first aspect of the present disclosure, a photocatalyst for hydrogen production from water. The photocatalyst comprises triphenylphosphine ruthenium (RuP) complex. The RuP complex is a co-catalyst with graphitic carbon nitride.

It has surprisingly been found that the synergistic combination of RuP complex with graphitic carbon nitride enhances charge production and hydrogen evolution from water as a photocatalyst.

Triphenylphosphine ruthenium complexes are designed to absorb light efficiently in the visible region of the electromagnetic spectrum. This property allows them to harvest a significant portion of sunlight, which is crucial for the overall efficiency of the photocatalysis process and solar cells.

Triphenylphosphine ruthenium exhibits a relatively long excited-state lifetime. This extended lifetime provides more time for efficient electron injection into the semiconductor material, contributing to improved charge separation.

The molar absorption coefficient of triphenylphosphine ruthenium complexes is relatively high. This means that even at lower concentrations, these sensitizers can efficiently absorb light, reducing the amount of sensitizer needed for a given photocatalysis process and solar cell.

Triphenylphosphine ruthenium complex is designed to be stable under prolonged light exposure. This stability is important for the long-term performance of dye sensitized solar cells (DSSCs) and photocatalytic water splitting for hydrogen production, ensuring consistent and reliable electricity generation.

The graphitic carbon nitride may be exfoliated graphitic carbon nitride.

The use of exfoliated graphitic carbon nitride has been found to provide a higher yield of hydrogen from water.

The RuP complex may be anchored on the graphitic carbon nitride.

The loading of the RuP complex on the graphitic carbon nitride may be between 1-5%. The loading of the RuP complex on the graphitic carbon nitride may be between 2-4%. The loading of the RuP complex on the graphitic carbon nitride may be substantially 3%. Substantially 3% may refer to a range of between 2.5% and 3.5%.

The anchoring of the RuP complex on the graphitic carbon nitride may be done using an impregnation technique.

The graphitic carbon nitride may be graphitic carbon nitride nanosheets.

The graphitic carbon nitride may be combined with titanium carbide ($Ti_3C_2$) MXenes.

The combination with titanium carbide MXenes has surprisingly been found to increase the light absorption and decrease the band gap energy. Increased efficiency is caused by quicker charge carrier separation and efficient visible light absorption when the co-catalyst is combined with titanium carbide MXenes.

The titanium carbide MXenes may be loaded at between 5-20% by weight. The titanium carbide MXenes may be loaded at between 5-15% by weight. The titanium carbide MXenes may be loaded at between 8-12% by weight. The titanium carbide MXenes may be loaded at substantially 10% by weight. Substantially 10% may refer to a range of between 9.5-10.5%.

The titanium carbide MXenes may comprise titanium dioxide ($TiO_2$) nanodots. The $TiO_2$ nanodots may be formed through in-situ growth.

The titanium dioxide nanodots may be formed by etching. The etching may be of titanium aluminum carbide ($Ti_3AlC_2$). The etching may comprise treatment with hydrofluoric acid (HF).

The etching may be performed for between 24-96 hours. The etching may be performed for between 36-60 hours. The etching may be performed for substantially 48 hours.

According to a second aspect of the present disclosure, there is provided a method of synthesizing a photocatalyst for hydrogen production from water. The method comprises forming a suspension of graphitic carbon nitride; adding triphenylphosphine ruthenium complex (RuP) to the suspension; and drying the suspension to form dried graphitic carbon nitride integrated with RuP.

The graphitic carbon nitride may be suspended in methanol.

The graphitic carbon nitride may be exfoliated graphitic carbon nitride.

The RuP may be dissolved in methanol prior to being added to the suspension.

The exfoliated graphitic carbon nitride may be formed using the following steps: mixing melamine and urea; heating the melamine and urea mixture to form a gas via the thermal decomposition of urea; and exfoliating layers of the graphitic carbon nitride; such that exfoliated graphitic carbon nitride is produced that comprises oxygen vacancies.

The exfoliated graphitic carbon nitride may be ground to form a powder.

The method may comprise dispersing titanium carbide MXenes ($Ti_3C_2$) in a solution; and adding the suspension of graphitic carbon nitride.

The $Ti_3C_2$ may be dispersed in a methanol solution.

The water may be a mixture of water and a sacrificial reagent.

The sacrificial reagent may be methanol.

The methanol may have a concentration of about 5% by volume. About 5% may refer to a range of between 3% to 7%. The concentration may be between 4% and 6%.

It has been found that sacrificial reagents significantly boost hydrogen yield, and their performance is higher in comparison to when using only water.

According to a third aspect of the present disclosure, there is provided a method of producing hydrogen from water, the method comprising feeding water through a photoreactor, the photoreactor comprising a photocatalyst as claimed in claim 1.

The photoreactor may be an externally reflected photoreactor.

The water may be a mixture of water and a sacrificial reagent.

The sacrificial reagent may be methanol.

The methanol may have a concentration of about 5% by volume. About 5% may refer to a range of between 3% to 7%. The concentration may be between 4% and 6%.

The water may comprise the photocatalyst.

The photocatalyst may have a concentration of between 0.5-1.5 mg/ml of water. The photocatalyst may have a concentration of between 0.8-1.2 mg/ml of water.

The photocatalyst may comprise triphenylphosphine ruthenium (RuP) complex. The RuP complex may be a co-catalyst with graphitic carbon nitride. The RuP complex may be a co-catalyst with titanium carbide ($Ti_3C_2$) with in-situ grown $TiO_2$).

It will be appreciated that features disclosed in relation to one aspect of the present disclosure may be combined with features disclosed in relation to another aspect of the present disclosure, and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

FIG. 3 shows a photoreactor according to an embodiment of the present disclosure.

FIGS. 4a-4d graphically show the effect of varying photocatalyst parameters on the yield of hydrogen according to an embodiment of the present disclosure.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of photocatalysts and more particularly to triphenylphosphine ruthenium photocatalysts for hydrogen production.

The principles of the present invention and their advantages are best understood by referring to FIG. 1 to FIG. 9. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
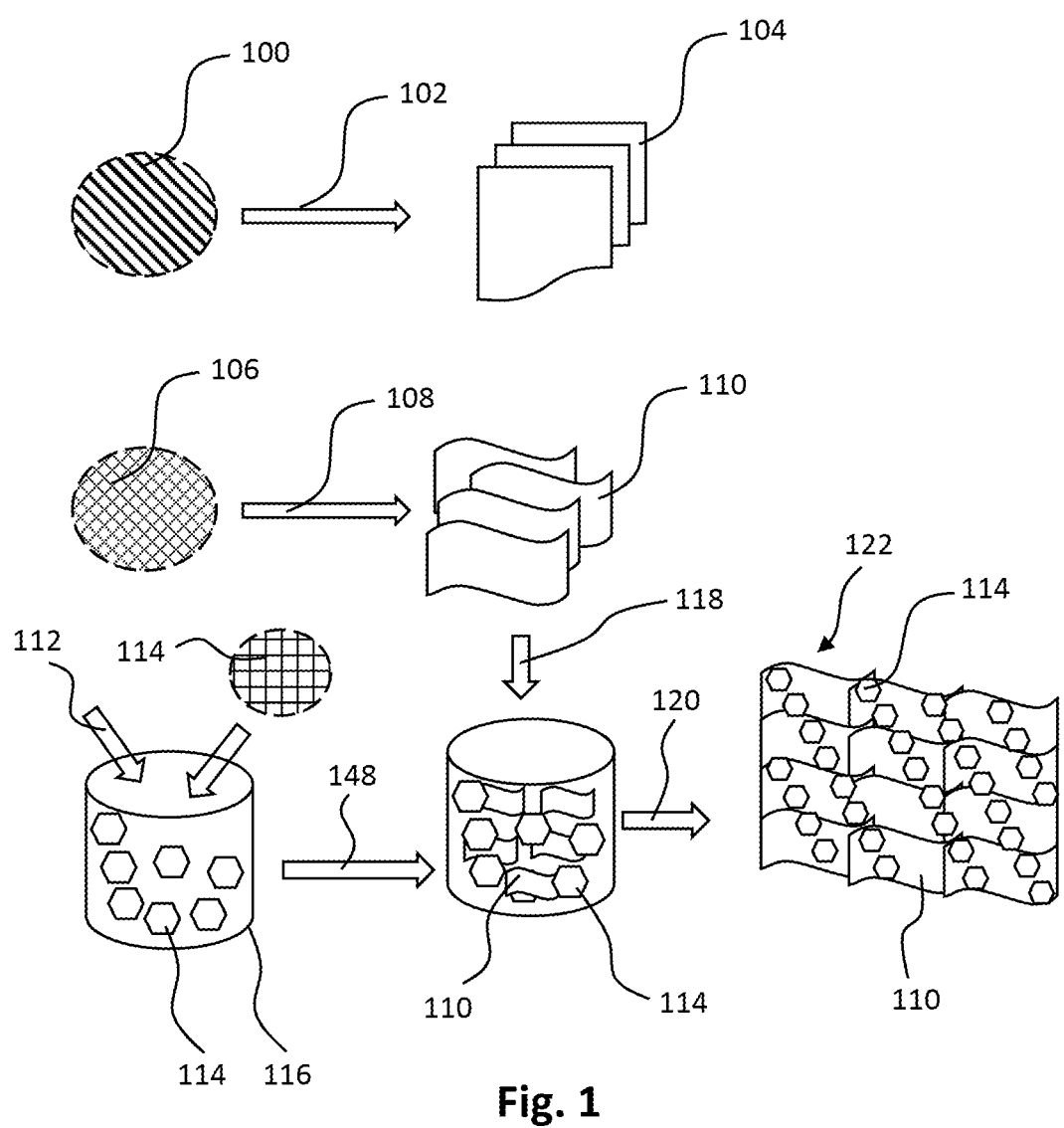
FIG. 1 shows a method of synthesizing RuP loaded exfoliated graphitic carbon nitride (ECN) photocatalysts according to an embodiment of the present disclosure.

FIG. 1 shows a method of synthesizing RuP loaded exfoliated graphitic carbon nitride (ECN) photocatalysts according to an embodiment of the present disclosure.

Graphitic carbon nitride 104 is produced using a melamine 100 precursor. The melamine 100 precursor is thermally decomposed 102 at 550° C. for 2 hours to arrive at graphitic carbon nitride 104.

For the synthesis of exfoliated graphitic carbon nitride (ECN) 110, a mixture of melamine and urea 106 is used. Melamine and urea 106 in equal amounts are mixed and placed in a ceramic crucible before being heated 108 to 550° C. for the duration of 2 hours. The gas produced by the decomposition of urea is used to exfoliate graphitic carbon nitride layers and produce defective graphitic carbon nitride with oxygen vacancies. The product obtained is grinded to a fine powder and is given name exfoliated graphitic carbon nitride (ECN).

The source of ruthenium is tris (triphenylphosphine) ruthenium (ii) dichloride, named RuP 114. By using an impregnation technique, RuP 114 was added to ECN. To achieve uniform dispersion, 0.5 g of ECN powder is disseminated in 20 mL of methanol and agitated for 2 hours 118. The ECN suspension is then combined with RuP 114, dissolved in methanol 112 (RuP-methanol solution 116), and agitated 148 for a further 2 hours at room temperature. The final product is oven dried 120 at 100° C. and is given name RuP/ECN. FIG. 1 shows the schematic representation for the synthesis of RuP loaded ECN nanosheets 122.

Figure 2:
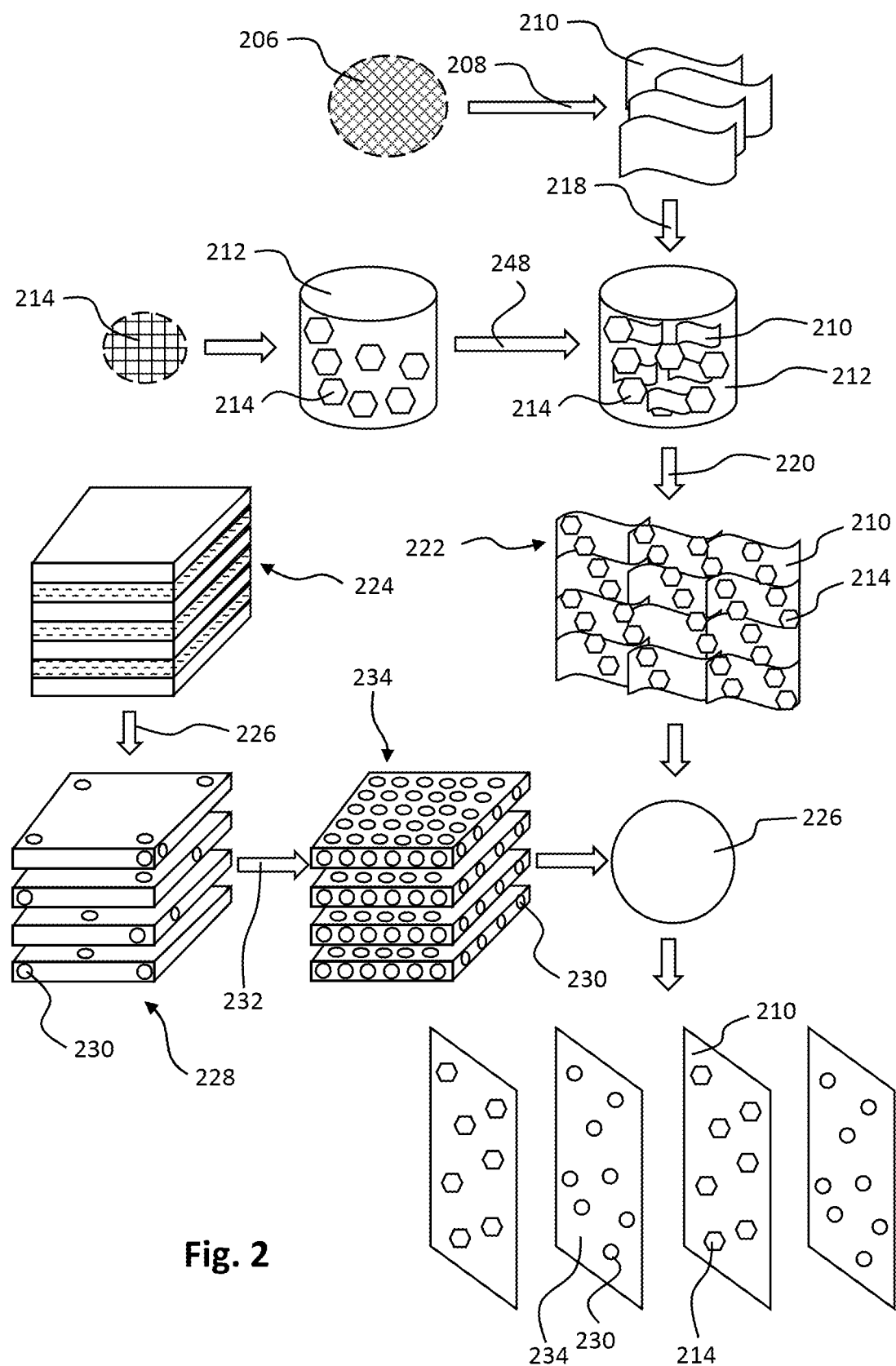
FIG. 2 shows a method of synthesizing RuP loaded ECN and titanium carbide nanocomposite according to an embodiment of the present disclosure.

FIG. 2 shows a method of synthesizing RuP loaded ECN and titanium carbide nanocomposite according to an embodiment of the present disclosure.

In the figure descriptions, like reference numerals denote like features. For example, feature 206 of FIG. 2 represents a like feature 106 of FIG. 1 (melamine and urea mixture, in this case).

Similar to the process in FIG. 1, melamine and urea mixture 206 is exfoliated 208 to produce ECN 210.

RuP 214 is dissolved in methanol 212 and agitated 248 with a solution of ECN 210 (which itself is ECN powder in methanol and agitated 218).

The final product is oven dried 220 at 100° C. is given name RuP/ECN.

Titanium aluminum carbide ($Ti_3AlC_2$) MAX 224 is etched 226 for 24 hours to arrive at multilayered titanium carbide ($Ti_3C_2$) MXenes 228. $Ti_3C_2$ MXenes are found to possess numerous characteristics, including great potential for charge carrier separation, higher surface hydrophilicity, mechanical, chemical, and thermal stability.

Further etching 232 of $Ti_3C_2$ MXenes 228 for 48 additional hours, obtained $Ti_3C_2$ MXenes 234 with in-situ converted $Ti_3C_2$ to $Ti_3C_2@TiO_2$.

The multi-layered $Ti_3C_2$ with in-situ grown $TiO_2$ nanoparticles are obtained through the hydrofluoric acid (HF) etching process.

In embodiments of the present disclosure, the $ECN/TiO_2$ Z-scheme heterojunction formation with the synergistic effect of $RuP/Ti_3C_2$ has been found to have a positive impact on maximizing solar hydrogen production. The reaction mechanism is proposed based on characterization results, in which the RuP role is to excite electrons to ECN, whereas $Ti_3C_2$ works as a sink to trap electrons from $ECN/TiO_2$, enabling significantly enhanced charge carrier separation. The higher photocatalytic activity is because of promoted reaction kinetics and proficient charge carrier separation in binary cocatalysts with in-situ grown nanoparticles of $TiO_2$ 230, enabling higher hydrogen production. Thus, dual function composite photocatalysts according to an embodiment of the present disclosure accelerate oxidation and reduction reactions through a multi-step process.

The RuP-embedded $Ti_3C_2@TiO_2/ECN$ nanocomposite is synthesized through an impregnation approach. Initially, $Ti_3C_2$ 234 is dispersed in a methanol solution, and then RuP/ECN is dispersed in a methanol solution and is added 226 to get good interface interaction. The mixture was agitated for an additional two hours after adding the ruthenium precursor, which had been dissolved in methanol. After drying at 100° C. (overnight), the product is denoted as RuP loaded $Ti_3C_2@TiO_2/ECN$ heterojunction.

FIG. 3 shows a photoreactor according to an embodiment of the present disclosure. The photoreactor comprises a solution containing photocatalyst 350 according to an embodiment of the present disclosure.

Transmitted light 303 passes into the photoreactor to initiate the reaction process. Typically, some light 301 is reflected off the reactor surface.

In embodiments, the photoreactor is a flat wall photoreactor. In embodiments, the photoreactor is an annular photoreactor.

The photoreactor of FIG. 3 is figurative and does not show all of the conventional details of typical photoreactors.

In embodiments of the present disclosure, there is provided a dye sensitized solar cell comprising a photocatalyst according to embodiments of the present disclosure.

To validate the method, EDX mapping was used to further explore the distribution of the elements in the RuP loaded ECN samples. In mapping photos, the consistent and excellent distribution of RuP over ECN was readily discernible, and confirmed the existence of Ru, C, N, and O components in the RuP/ECN composite. These findings support the effective synthesis of RuP/ECN composite and would be useful for efficient charge carrier separation with improved light distribution.

TEM analysis was conducted to further investigate the morphology of the ECN and RuP-loaded ECN samples, and the results show morphology of ECN. It was observed that ECN has a 2D layered structure, in which graphitic carbon nitride sheets are exfoliated, giving obvious gaps between the layers. The morphology of RuP/ECM composite reveals an exfoliated structure of ECN, where each layer is separated from the others, providing openings for light to penetrate. The analysis shows that RuP particles are entirely distributed over the ECN surface to provide good interface interaction between both the materials. High-resolution TEM (HRTEM) images reveal an amorphous structure of ECN with the presence of RuP. The presence of RuP was clearly observed in high resolution images which further confirmed the successful fabrication of the RuP/ECN composite.

Live fast Fourier transform (FFT) images were used to calculate lattice spacing and their values were found to be 0.32 nm, which corresponds to graphitic carbon nitride.

All these findings demonstrate that RuP/ECN nanotextures can successfully be fabricated according to embodiments of the present disclosure, and that they would be useful for the efficient separation of photoinduced carriers to maximize photocatalytic performance.

Experimentation: RuP/ECN

Photocatalytic water splitting was carried out using a slurry photoreactor system in which specific amount of catalyst (100 mg) was uniformly dispersed using magnetic stirrer. Methanol (5 vol %) was utilized as the sacrificial reagent for the photocatalyst screening. When exposed to low power visible light of 35 W with an intensity of 20 mW/cm2, performance assessment of pure and modified photocatalysts was compared in relation to hydrogen production.

FIGS. 4a-4d graphically show the effect of varying photocatalyst parameters on the yield of hydrogen according to an embodiment of the present disclosure.

The morphological effect of graphitic carbon nitride (CN) and graphitic carbon nitride nanosheets (ECN) for photocatalytic hydrogen generation was first calculated. Photocatalytic hydrogen development over CN and ECN samples at various irradiation time is presented in FIG. 4a. Using CN, the yield of hydrogen of 25 µmole was achieved after 3 h of irradiation time 407, whereas ECN produces 24% more hydrogen yield (31 µmole 405) compared to CN photocatalyst. The greatest hydrogen yield using ECN was 103 µmol $g^{-1}h^{-1}$, which is 1.24 times more than utilizing bulk CN nanosheets. This demonstrates that the ECN structure has more advantages for producing a larger yield of hydrogen. Evidently, less charge recombination and higher BET surface area allowed for greater hydrogen evolution under visible light. The performance of ECN was further compared with the standard $TiO_2$ (P25), and the results are shown in FIG. 4b. Initially, lower amount of hydrogen was produced over the $TiO_2$, however, it was significantly higher than ECN over the irradiation time, with the $TiO_2$ hydrogen yield 409 being almost triple that of the ECN 411 by 120 minutes. As the $TiO_2$ (P25) has the nanoparticles (<21 nm) with mesoporous structure and higher surface area, thus, it was more promising to enhance hydrogen production. The performance of pure CN can be made more efficient when modified with some types of metals and other cocatalysts. Comparatively, pure $TiO_2$ is more efficient than pristine CN due to more charge recombination in CN.

Figure 4C:
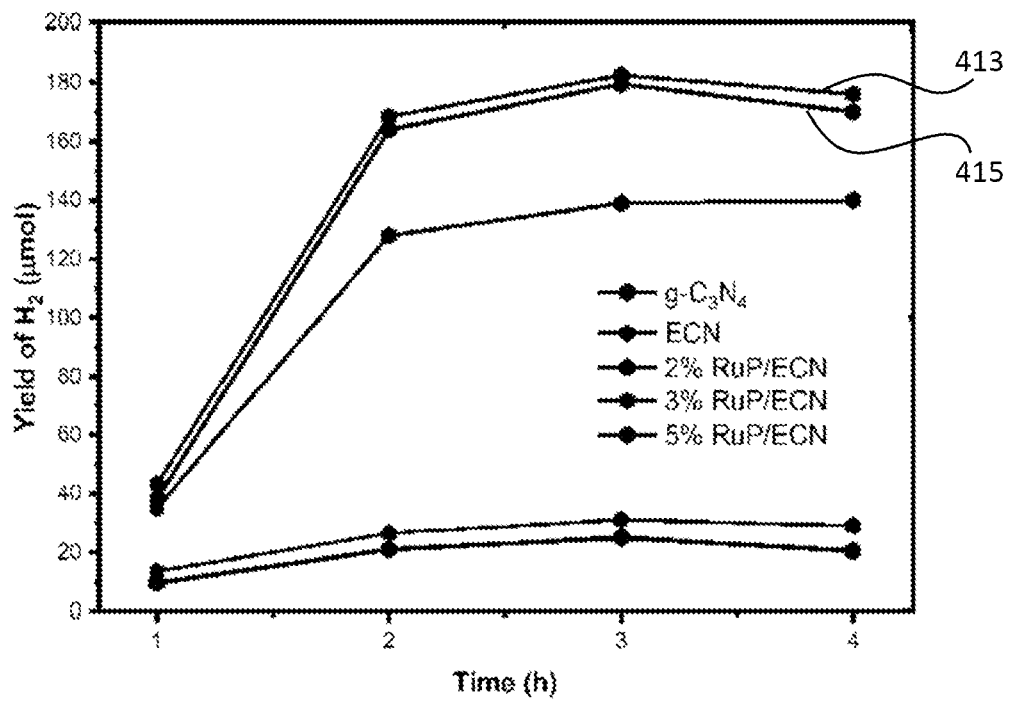

FIG. 4c shows the photocatalytic hydrogen generation over several RuP loaded ECN samples. Compared to CN and ECN samples, hydrogen yield was significantly enhanced with RuP loading. Using 2% RuP, hydrogen yield was raised to 140 µmol with the ECN sample. However, a significant quantity of hydrogen was produced when ECN was loaded with optimized 3% RuP loading 413 (176 µmol), which was 6.1 and 8.6 times more than utilizing pristine ECN sample, respectively. 5% RuP loading is represented by the line 415, which is slightly lower than the 3% loading 413. Due to increased electron generation over the ECN under visible light irradiation because of RuP photosensitizer, the hydrogen yield over RuP/ECN was clearly improved. However, the yield of hydrogen is negatively impacted by loading over 4 wt % RuP loading. The increasing RuP loading increased the blackish color of ECN, which lowers light penetration into the slurry system.

In embodiments of the present disclosure, the loading of RuP is between 2% and 5%.

Figure 4D:
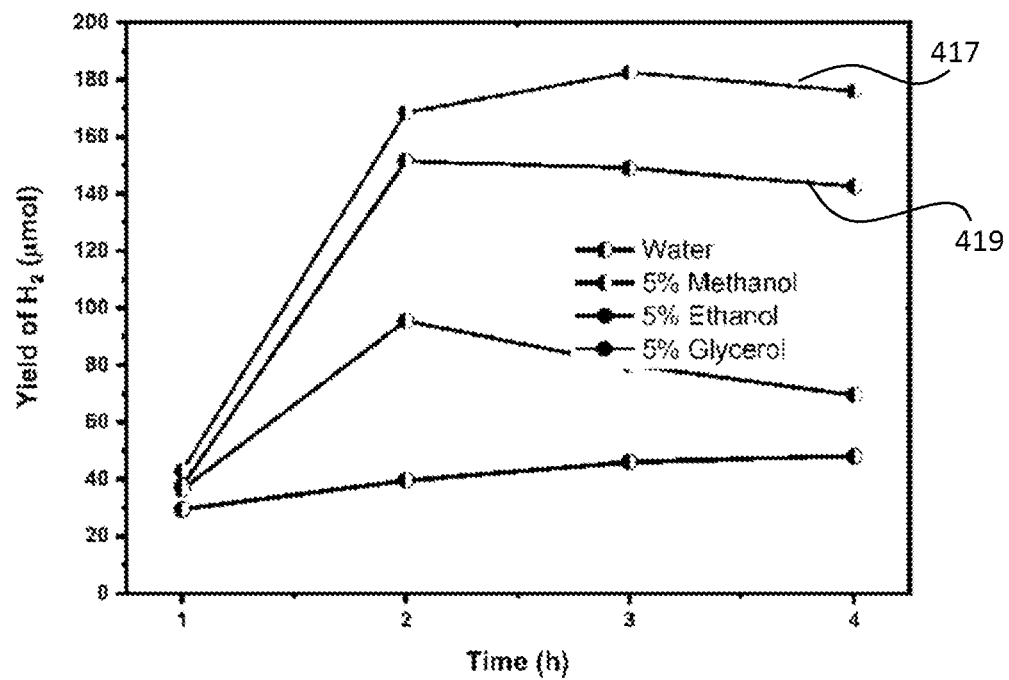

The photocatalytic performance of RuP/ECN was further investigated using 5 vol % concentrations of methanol, ethanol, and glycerol as sacrificial reagents. FIG. 4d illustrates the performance comparison of these three reagents for photocatalytic hydrogen generation. While pure water generated 48 µmol of hydrogen over a 3RuP/ECN (the "3" representing 3% loading) photocatalyst after 4 h of irradiation time, the addition of sacrificial reagents such as glycerol, methanol, and ethanol improved the hydrogen production. The use of glycerol resulted in a hydrogen production of 69.5 µmol, a 1.45-fold improvement over using water only. Methanol 417 has produced the maximum hydrogen yield of 176 µmol, which is 1.23, 2.53, and 3.67 times greater than the yields obtained with ethanol 419, glycerol, and pure water, respectively.

The presence of a sacrificial reagent can increase the number of protons (H+) produced during the water splitting process. Therefore, in addition to generating the protons and electrons required for hydrogen reduction, the sacrificial reagent also traps holes to prevent the recombination of charges. Sacrificial reagent, in general, traps holes and is useful for producing electrons, resulting in an abundance of protons (H+) and electrons (e−) for the reduction reaction to produce hydrogen. As a result, lower hydrogen yield with water can be attributed to more recombination of electron-hole pairs rather and lower proton (H+) generation.

Experimentation: RuP-Embedded $Ti_3C_2$@$TiO_2$/ECN

Field emission scanning electron microscopy (FESEM) was used to explore further the surface morphology and composition data of $Ti_3AlC_2$, $Ti_3C_2$, ECN, and their composites.

Stacks of sheets are visible in the compact block structure of $Ti_3AlC_2$. $Ti_3C_2$ MXene was produced in a 2D layered structure after being etched with hydrofluoric acid (HF) for 24 h, as illustrated in FIG. 2. The $Ti_3C_2$ presents an accordion-like structure, in which 2D nanosheets are loosely stacked to give multilayered nanotexture. As a result, $Ti_3C_2$ may be seen to have a multilayer structure with a smooth surface and very few particles of $TiO_2$ produced on the layered surface.

When the etching duration is extended to 48 hours, more $TiO_2$ nanoparticles are produced. This is due to the conversion of $Ti_3C_2$ MXene to $TiO_2$ at the prolonged etching time, and it can work as a semiconductor to have photoinduced charge carriers. This can provide more active sites and surface functional groups with $TiO_2$ nanoparticles (NPs) to work as the binder to make it easier to interact with other materials and reactants.

Very small-size $TiO_2$ NPs embedded over 2D layered stricture were achieved without destroying the original structure of MXene according to embodiments of the present disclosure.

Furthermore, when the etching time was increased to 96 hours, the amount of $TiO_2$ was decreased compared to its production after 48 hours. This was probably due to detaching $TiO_2$ NPs from the $Ti_3C_2$ surface after a prolonged stirring time. However, it was observed that after increasing etching time, layered gaps between $Ti_3C_2$ sheets were increased, and $TiO_2$ NPs were also grown at the surface of the $Ti_3C_2$ sheets within the galleries. This was possibly due to converting more $Ti_3C_2$ MXene to $TiO_2$, sheets becoming thin, and their gaps increased over increasing etching time.

Figure 5A:
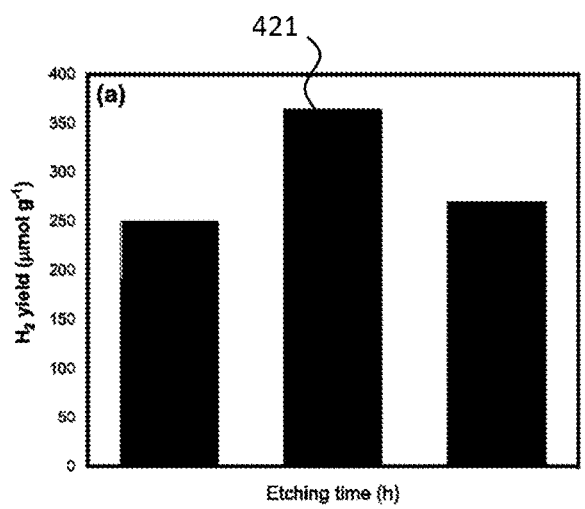
FIGS. 5a-5b show the effect of varying titanium carbide parameters on the yield of hydrogen according to an embodiment of the present disclosure.
Figure 5B:
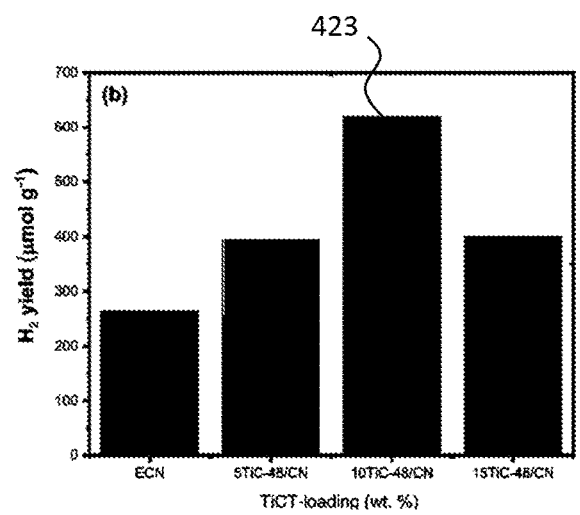

FIGS. 5a-5b show the effect of varying titanium carbide parameters on the yield of hydrogen according to an embodiment of the present disclosure.

The performance of the photocatalysts was tested in a slurry photoreactor system, in which 5-vol % sacrificial reagent (methanol) and 100 mg photocatalyst were used. The effect of etching time on the performance of $Ti_3C_2$ was investigated. For this purpose, $Ti_3C_2$ etched at three different times: 24, 48 and 96 hours, were tested for photocatalytic hydrogen production while keeping all other reaction parameters identical. As shown in FIG. 5a, HER (photocatalytic hydrogen evolution) reaction for hydrogen production was different at various durations of 24, 48, and 96 hours. Even though $Ti_3C_2$ has metallic characteristics and would not be expected to produce hydrogen, its photoactivity can be attributed to the photoactivation of $TiO_2$ NPs grown over its surface, which results in the formation of charge carriers when exposed to light irradiation.

More significantly, during etching for 24 hours. 125 µmol $g^{-1}h^{-1}$ of hydrogen was produced; this value increased to 182.5 µmol g$^{-1}$h$^{-1}$ when etching was conducted for 48 hours. The higher hydrogen production with increasing etching time was due to more formation of TiO$_2$ NPs over the Ti$_3$C$_2$ surface, which works as the semiconductor to produce photoinduced electrons, whereas Ti$_3$C$_2$ works as a sink to trap electrons for the reduction reaction to produce hydrogen. Due to Ti$_3$C$_2$ metallic properties, its role in the generation of hydrogen can be attributed to the trapping of electrons from TiO$_2$ CB that was developed on its surface during the HF etching process. However, a decline in hydrogen production was observed when etching time was increased above 48 hours. This was likely due to excessive production of TiO$_2$ NPs, but they were detached from the Ti$_3$C$_2$ surface due to continuous stirring and during the washing process. These results are in good agreement with the characterization results supported by XRD, SEM, RAMAN and others. Thus, 48 h is the optimized etching time, giving the highest photocatalytic activity for hydrogen production.

In embodiments of the present disclosure, the etching time is between 24 and 72 hours. In embodiments of the present disclosure, the etching time is between 36 and 60 hours.

FIG. 5b illustrates the photocatalytic activity of Ti$_3$C$_2$/ECN composites with various loading amounts of Ti$_3$C$_2$, synthesized after 48 hours of etching time. Using pure ECN, hydrogen evolution was not substantial, perhaps because charge carriers had a shorter lifetime. More significantly, during etching for 24 hours, 125 µmol g$^{-1}$h$^{-1}$ of hydrogen was produced: this value increased to 182.5 µmol g$^{-1}$h$^{-1}$ when etching was conducted for 48 hours.

The highest hydrogen evolution rate of 310 µmol g$^{-1}$h$^{-1}$ was obtained over 10 wt % Ti$_3$C$_2$ loading with ECN 423, which is 1.56, 1.55 and 2.34 times higher than it was produced using 15% Ti$_3$C$_2$, 5% Ti$_3$C$_2$ and pure ECN samples, respectively.

Due to the metallic character of Ti$_3$C$_2$, a faster charge carrier separation over the ECN would be achieved, enabling an increase HER reaction for hydrogen production.

Figure 6:
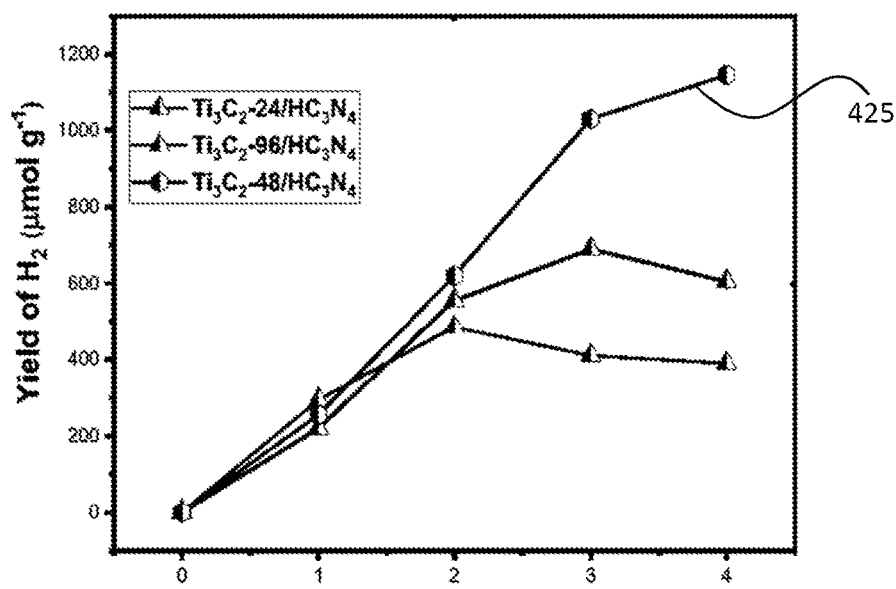
FIG. 6 shows the effect of various etching and irradiation time on the yield of hydrogen according to an embodiment of the present disclosure.

FIG. 6 shows the effect of various etching and irradiation time on the yield of hydrogen according to an embodiment of the present disclosure.

Further research was done on how irradiation time and etching time affected the performance of optimized Ti$_3$C with ECN, and the results are shown in FIG. 6. Initially, after one hour of irradiation time, the highest hydrogen yield was obtained using Ti$_3$C$_2$ produced after 96 hours of etching time. However, over the irradiation time, its performance was dropped. These results are expected due to the exfoliated Ti$_3$C$_2$ nanosheets with TiO$_2$ NPs, enabling more light absorption and generation of charge carriers. However, due to less availability of TiO$_2$ NPs and their dispatched during continuous stirring, charge separation was lower compared to Ti$_3$C$_2$ synthesized after 48 hours of irradiation time 425. More importantly, photocatalytic hydrogen production results resembled the previously discussed pristine Ti$_3$C$_2$ samples. This shows that no matter how much TiO$_2$ is grown, it acts as an electron mediator, moving electrons from ECN towards Ti$_3$C$_2$ nanosheets to increase the reduction reaction to produce more hydrogen.

Figure 7:
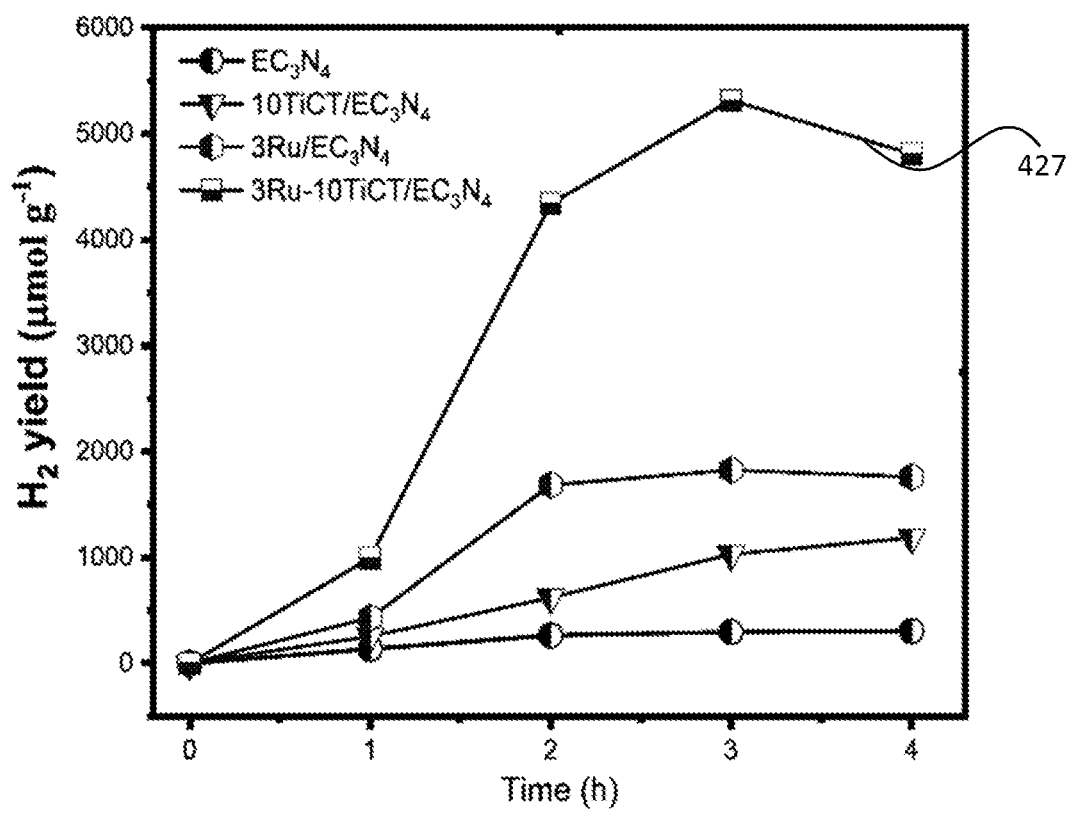
FIG. 7 shows the effect of RuP and titanium carbide loading on the yield of hydrogen according to an embodiment of the present disclosure.

FIG. 7 shows the effect of RuP and titanium carbide loading on the yield of hydrogen according to an embodiment of the present disclosure.

The synergistic effect of RuP and Ti$_3$C$_2$@TiO$_2$ with ECN was further explored using optimized 3 wt % RuP and 10 wt % Ti$_3$C$_2$ synthesized after 48 hours of etching time, and the results are shown in FIG. 7. In general, production of hydrogen was continuous with Ti$_3$C$_2$/ECN composite over the entire irradiation time; however, using RuP-based composite 427, photocatalytic activity declined after the third hour of reaction time. Using pure ECN. 305 µmol g$^{-1}$ of hydrogen was produced, which was increased to 1760 and 1185 µmol g$^{-1}$ when coupled with RuP and Ti$_3$C$_2$ MXene respectively after 4 hours. The maximum hydrogen production of 5315 µmol g$^{-1}$ was obtained using RuP—Ti$_3$C$_2$/ECN composite 427 samples. This amount of hydrogen produced was 2.91, 5.16 and 18.01-fold more than using RuP/ECN, Ti$_3$C$_2$/ECN and ECN samples, respectively.

Due to the synergistic interaction between RuP and Ti$_3$C$_2$ MXene and ECN, which allowed excited electrons to be transported to the CB of ECN by RuP and effectively trapped by Ti$_3$C$_2$, the photocatalytic activity for the formation of hydrogen was significantly increased. Furthermore, quantum yield (QY) of the pure and the composite was calculated based on production rate and photon flux utilization. Using RuP—Ti$_3$C$_2$/ECN, QY of 5.18% was obtained for hydrogen production, which was 2.91, 5.16 and 18.02 times higher than using RuP/ECN, Ti$_3$C$_2$/ECN and pure ECN samples, respectively.

Figure 8:
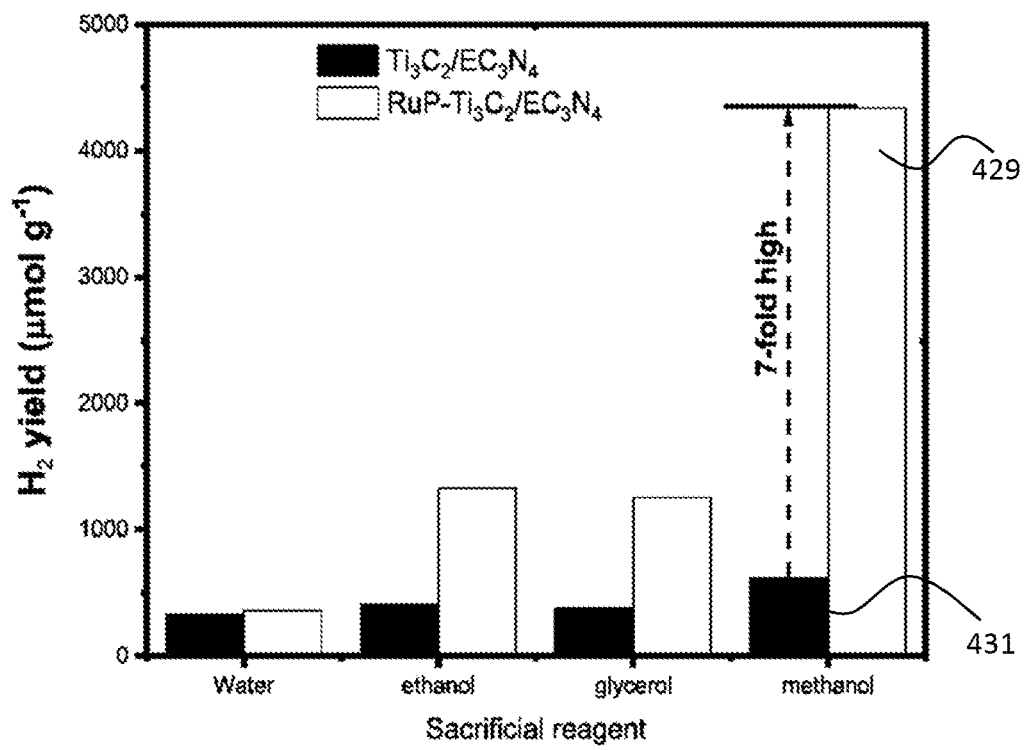
FIG. 8 shows the effect of sacrificial reagent on the yield of hydrogen according to an embodiment of the present disclosure.

FIG. 8 shows the effect of sacrificial reagent on the yield of hydrogen according to an embodiment of the present disclosure.

The performance comparison of Ti$_3$C$_2$/ECN and RuP—Ti$_3$C$_2$/ECN composites was further investigated using other sacrificial reagents; their results are presented in FIG. 8. In both cases, 5 vol % of methanol, glycerol and ethanol sacrificial reagents were used to examine the photocatalytic activity further. Using only water. 360 and 325 µmol g$^{-1}$ hydrogen yields were produced with RuP—Ti$_3$C$_2$/ECN and Ti$_3$C$_2$/ECN, respectively, which was only 1.08 times higher when RuP was loaded to Ti$_3$C$_2$/ECN composite. Using methanol as the sacrificial reagent, the performance of RuP—Ti$_3$C$_2$/ECN composite 429 was 7-fold higher than hydrogen produced over Ti$_3$C$_2$/ECN photocatalyst 431. Sacrificial reagents, significantly boost hydrogen yield, and their performance was higher in order methanol>ethanol>glycerol using both composite materials. The amount of hydrogen produced with methanol and RuP—Ti$_3$C$_2$/ECN composite was 12.1 folds higher than using only water. When ethanol was used, 1325 µmol g$^{-1}$ of hydrogen was produced with RuP—Ti$_3$C$_2$/ECN composite, a 3.68-fold increase than when water alone was used and 3.23 times more when only Ti$_3$C$_2$/ECN was employed. Among the three sacrificial reagents, the lowest hydrogen amount was produced when glycerol was used with both the composite materials, whereas the performance of RuP—Ti$_3$C$_2$/ECN composite was 3.49-fold higher than using composite without RuP.

Figure 9:
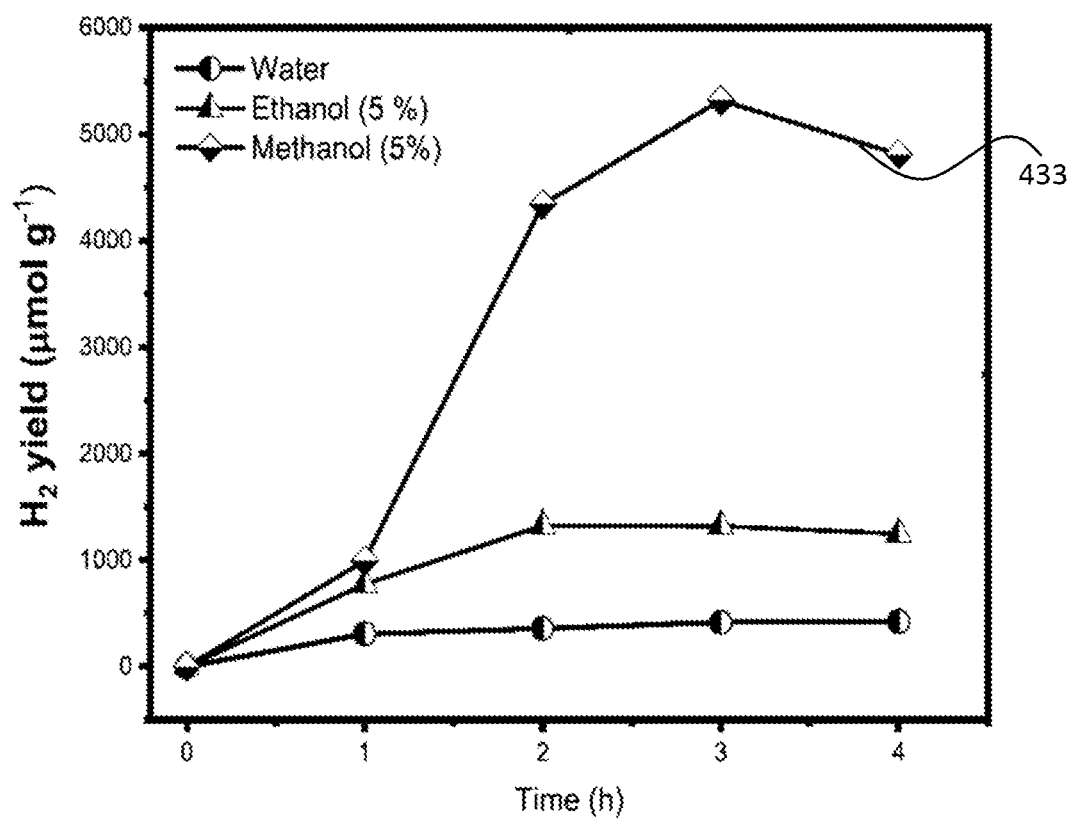
FIG. 9 shows the effect of irradiation time and sacrificial reagent on the yield of hydrogen according to an embodiment of the present disclosure.

FIG. 9 shows the effect of irradiation time and sacrificial reagent on the yield of hydrogen according to an embodiment of the present disclosure.

Further research on the impact of irradiation time on the performance of the RuP—Ti$_3$C$_2$/ECN composite with water, methanol, and ethanol as sacrificial reagents is shown in FIG. 9. Using water, continuous hydrogen production was obtained; however, with ethanol and methanol, it slightly declined after 3 hours of irradiation time. This could be because the reaction temperature is rising, which prevents reactants from adhering to the catalyst's surface, or it might be because methanol is consumed during photocatalysis. Comparatively, the highest hydrogen yield was produced with methanol as the sacrificial reagent over RuP—Ti$_3$C$_2$/ECN composite, which was 3.27, 3.46 and 12.1 folds higher than using ethanol, glycerol and water, respectively.

RuP—Ti$_3$C$_2$/ECN composite according to embodiments of the present disclosure can be synthesized and utilized for photocatalytic hydrogen evolution. Compared to bulk CN, ECN was more efficient due to its layered structure with efficient charge separation. The performance of ECN was enhanced when coupled with Ti$_3$C$_2$ and RuP to construct Ti$_3$C$_2$/ECN, RuP/ECN and RuP—Ti$_3$C$_2$/ECN composites. Comparatively, TiO$_2$ NPs embedded over Ti$_3$C$_2$ multilayered nanotexture after 48 hours of etching time were most efficient in promoting photocatalytic hydrogen evolution. Due to the minimal charge carrier recombination effect and efficient separation provided by the presence of highly conductive nanosheets, Ti$_3$C$_2$ produces significantly more hydrogen when mixed with ECN. On the other hand, RuP enables the injection of excited electrons to the CB of ECN, resulting in improved hydrogen production. The synergistic effect of RuP/Ti$_3$C$_2$, with ECN significantly enhances hydrogen production, whereas in embodiments, the highest yield of 5315 μmol g$^{-1}$ is produced after 3 hours of reaction time. The composite is also stable to produce hydrogen in multiple cycles.

Figure 10:
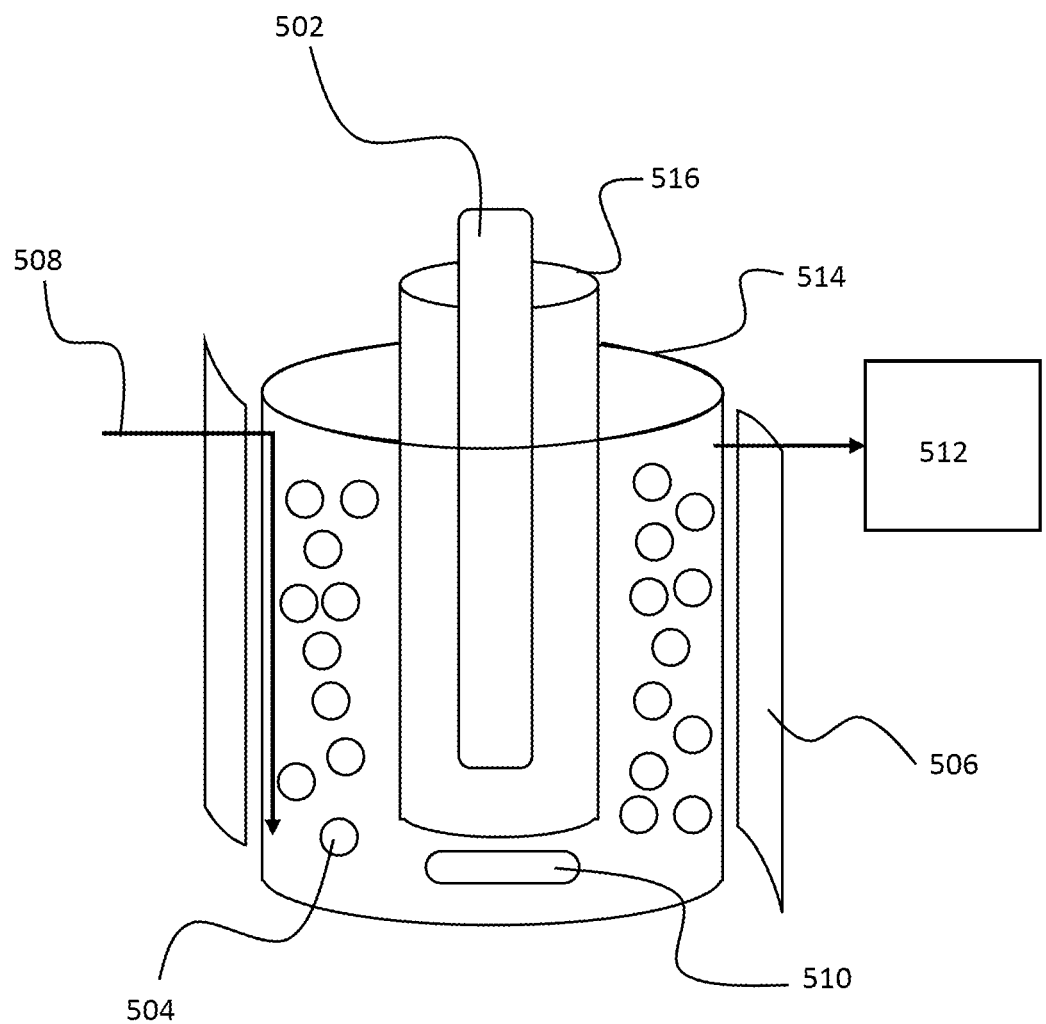
FIG. 10 shows a diagram of a photoreactor according to an embodiment of the present disclosure.

FIG. 10 shows a diagram of a photoreactor according to an embodiment of the present disclosure.

The photoreactor is an externally reflected photoreactor.

The photoreactor consists of a cylindrical shell 514 which contains catalysts 504 and water solution to carry the photocatalysis reaction. A lamp 502 is placed inside the inner shell 516, which has a light intensity of 20 mW c$^{-2}$ and wavelength similar to that of solar energy. To maximize the concentration of light inside the slurry system, the outer cylindrical vessel 514 is covered with a parabolic reflector 506. Typically, 100 mL of water solution containing 5 percent methanol and the precise amount of photocatalyst 504 (100 mg) is added inside the reactor chamber. To dissipate the heat generated by the bulb, a water circulation system 510 is attached to the cylinder. The water circulation system 510 may be a magnetic stirrer. A parabolic reflector 506 is connected to the outside of the glass cylinder to reflect the light irradiations from the lamp 502, which allows for a systematic comparison of the photocatalytic system's performance with and without the reflector. Nitrogen 508 flows continuously, and after every hour, the byproducts are collected using gas sampling bags and are analyzed using gas analyzer 512 and gas chromatography (GC-TCD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

I claim:

1. A method of synthesizing a photocatalyst for hydrogen production from water, the method comprising:
   forming a suspension of graphitic carbon nitride;
   adding triphenylphosphine ruthenium complex (RuP) to the suspension;
   dispersing titanium carbide MXenes (Ti$_3$C$_2$) in a solution;
   combining the solution and the suspension; and
   drying the suspension to form dried titanium carbide MXenes (Ti$_3$C$_2$)/graphitic carbon nitride integrated with RuP.

2. The method as claimed in claim 1, wherein the graphitic carbon nitride is suspended in methanol.

3. The method as claimed in claim 1, wherein the graphitic carbon nitride is exfoliated graphitic carbon nitride.

4. The method as claimed in claim 1, wherein the RuP is dissolved in methanol prior to being added to the suspension.

5. The method as claimed in claim 3, wherein the exfoliated graphitic carbon nitride is formed using the following steps:
   mixing melamine and urea;
   heating the melamine and urea mixture to form a gas via the thermal decomposition of urea; and
   exfoliating layers of the graphitic carbon nitride;
   such that exfoliated graphitic carbon nitride is produced that comprises oxygen vacancies.

6. The method as claimed in claim 5, wherein the exfoliated graphitic carbon nitride is ground to form a powder.

7. A method as claimed in claim 1, wherein the Ti$_3$C$_2$ is dispersed in a methanol solution.

8. The method as claimed in claim 1, wherein the water is a mixture of water and a sacrificial reagent.

9. The method as claimed in claim 8, wherein the sacrificial reagent is methanol.

10. The method as claimed in claim 9, wherein the methanol has a concentration of 5% by volume.

* * * * *